US011193695B2

(12) United States Patent
Yang et al.

(10) Patent No.: US 11,193,695 B2
(45) Date of Patent: Dec. 7, 2021

(54) SOLAR HEAT ABSORBER, SOLAR HEAT COLLECTING SYSTEM AND SOLAR POWER GENERATION SYSTEM WITH CERAMIC PARTICLES

(71) Applicant: Institute of Modern Physics, Chinese Academy of Sciences, Gansu (CN)

(72) Inventors: Lei Yang, Gansu (CN); Xiaofei Gao, Gansu (CN); Yangyang Yang, Gansu (CN); Sheng Zhang, Gansu (CN); Yuan Tian, Gansu (CN); Jianrong Zhang, Gansu (CN); Ping Lin, Gansu (CN)

(73) Assignee: INSTITUTE OF MODERN PHYSICS, CHINESE ACADEMY OF SCIENCES, Gansu (CN)

( * ) Notice: Subject to any disclaimer, the term of this patent is extended or adjusted under 35 U.S.C. 154(b) by 94 days.

(21) Appl. No.: 16/473,464

(22) PCT Filed: Dec. 26, 2016

(86) PCT No.: PCT/CN2016/112040
§ 371 (c)(1),
(2) Date: Jun. 25, 2019

(87) PCT Pub. No.: WO2018/119556
PCT Pub. Date: Jul. 5, 2018

(65) Prior Publication Data
US 2020/0149782 A1 May 14, 2020

(51) Int. Cl.
*F24S 70/16* (2018.01)
*F24S 20/20* (2018.01)
(Continued)

(52) U.S. Cl.
CPC .............. *F24S 70/16* (2018.05); *F03G 6/067* (2013.01); *F24S 10/40* (2018.05); *F24S 10/72* (2018.05);
(Continued)

(58) Field of Classification Search
CPC .................................. F24S 70/16; F03G 6/067
See application file for complete search history.

(56) References Cited

U.S. PATENT DOCUMENTS 10,508,834 B1 * 12/2019 Ho ........................... F24S 10/60
10,830,497 B2 * 11/2020 Krause ................ C04B 35/1115
(Continued)

FOREIGN PATENT DOCUMENTS

CN        101122422 A  *  2/2008  .............. F24S 20/20
CN        101634490 A  *  1/2010
(Continued)

OTHER PUBLICATIONS

Extended European Search Report dated May 8, 2020 received in European Application No. 16 925 632.8.
International Search Report dated Oct. 11, 2017 received in International Application No. PCT/CN2016/112040, together with an English-language translation.
European Office Action dated Oct. 2, 2020 received in European Application No. 16 925 632.8.

*Primary Examiner* — Laert Dounis
(74) *Attorney, Agent, or Firm* — Scully, Scott, Murphy & Presser, P.C.

(57) ABSTRACT

The present disclosure provides a solar heat absorber including: an inlet through which a heat collecting medium enters the solar heat absorber; a passage member configured to be fluidly connected with the inlet such that the heat collecting medium enters the passage member through the inlet; and a collection member configured to be fluidly connected with the passage member such that the heat collecting medium enters the collection member through the passage member. In the solar heat absorber according to the present disclosure, the ceramic particles are used as the heat collecting (Continued)

medium. In addition, the present disclosure also provides a solar heat collecting system including the solar heat absorber, and a solar power generation system including the solar heat collecting system.

9 Claims, 7 Drawing Sheets

(51) Int. Cl.
*F24S 10/80* (2018.01)
*F24S 23/70* (2018.01)
*F03G 6/06* (2006.01)
*F24S 80/00* (2018.01)
*F24S 60/00* (2018.01)
*F24S 10/40* (2018.01)
*F24S 10/70* (2018.01)
*F24S 80/20* (2018.01)

(52) U.S. Cl.
CPC ............... *F24S 10/80* (2018.05); *F24S 20/20* (2018.05); *F24S 23/70* (2018.05); *F24S 60/00* (2018.05); *F24S 80/20* (2018.05); *F24S 2080/011* (2018.05); *Y02E 10/46* (2013.01); *Y02E 60/14* (2013.01)

(56) References Cited

U.S. PATENT DOCUMENTS

| | | | | |
|---|---|---|---|---|
| 2010/0089391 | A1* | 4/2010 | Addie | F24S 60/00 |
| | | | | 126/617 |
| 2013/0220309 | A1* | 8/2013 | Majima | F24S 10/80 |
| | | | | 126/664 |
| 2013/0228163 | A1 | 9/2013 | Wait | |
| 2013/0284163 | A1* | 10/2013 | Flamant | F28D 20/0056 |
| | | | | 126/634 |

FOREIGN PATENT DOCUMENTS

| | | | |
|---|---|---|---|
| CN | 103148596 A | | 6/2013 |
| CN | 103216952 A | * | 7/2013 |
| CN | 105318562 A | | 2/2016 |
| CN | 105318577 A | | 2/2016 |
| CN | 105318579 A | | 2/2016 |
| CN | 106524541 A | | 3/2017 |
| DE | 10 2014 106 320 A1 | | 11/2015 |
| JP | 3862485 B2 | | 12/2006 |
| JP | 2014/184961 A1 | | 11/2014 |

* cited by examiner

SOLAR HEAT ABSORBER, SOLAR HEAT COLLECTING SYSTEM AND SOLAR POWER GENERATION SYSTEM WITH CERAMIC PARTICLES

CROSS-REFERENCE TO RELATED APPLICATION

This application is a Section 371 National Stage Application of International Application No. PCT/CN2016/112040, filed on Dec. 26, 2016, entitled "SOLAR HEAT ABSORBER, SOLAR HEAT COLLECTING SYSTEM AND SOLAR POWER GENERATION SYSTEM", which is incorporated herein by reference in their entirety.

TECHNICAL FIELD

The present disclosure relates to a solar heat absorber, a solar heat collecting system and a solar power generation system.

BACKGROUND

A solar heat absorber is a key component for converting light into heat in a solar power generation system, and its design has always been an important issue in the field of solar power generation. A heat absorbing medium in the solar heat absorber has an important influence on a heat collecting efficiency of the solar heat absorber. In the prior art, a heat absorber in which molten salt, air and saturated wet steam serve as the heat absorbing medium is often used, but the heat absorbing medium has disadvantages that it is easy to decompose at a high temperature, it cannot flow uniformly, it locally overheats, a device is easily corroded and failed, and the like.

SUMMARY

According to embodiments of the present disclosure, there is provided a solar heat absorber including: an inlet through which a heat collecting medium enters the solar heat absorber; a passage member configured to be fluidly connected with the inlet such that the heat collecting medium enters the passage member through the inlet; and a collection member configured to be fluidly connected with the passage member such that the heat collecting medium enters the collection member through the passage member.

In accordance with embodiments of the present disclosure, the heat collecting medium is a flow of ceramic particles.

In accordance with embodiments of the present disclosure, the ceramic particles have a packing factor of 0.5-0.7.

In accordance with embodiments of the present disclosure, each of the ceramic particles has a diameter of 0.1 mm-6 mm.

In accordance with embodiments of the present disclosure, a material of the ceramic particles is selected from one of a carbide ceramic, a nitride ceramic or an oxide ceramic, or a mixture thereof.

In accordance with embodiments of the present disclosure, the flow of the ceramic particles is configured to have a flow speed of 0.1-2 m/s.

In accordance with embodiments of the present disclosure, the passage member includes: a plurality of passage units, each including: a hole in which the heat collecting medium flows; and a base body surrounding the hole; and an outer layer portion fixing the passage units to be integrated.

In accordance with embodiments of the present disclosure, the passage unit has a shape of a prism or a chute.

In accordance with embodiments of the present disclosure, the collection member has a funnel shape.

In accordance with another aspect of the present disclosure, there is provided a solar heat collecting system including the above solar heat absorber.

In accordance with embodiments of the present disclosure, the solar heat collecting system further includes: a heat collecting medium storage device which is disposed upstream of the solar heat absorber in a flow direction of the heat collecting medium, and which is in communication with the solar heat absorber through a pipe such that the heat collecting medium flows from the heat collecting medium storage device into the solar heat absorber; a heat exchanger which is disposed downstream of the solar heat absorber in the flow direction of the heat collecting medium, which is in communication with the solar heat absorber through a pipe, and which is configured to transfer a heat absorbed by the heat collecting medium from the heat collecting medium; a heat collecting medium dust remover which is disposed downstream of the heat exchanger in the flow direction of the heat collecting medium, which is in communication with the heat exchanger through a pipe, and which is configured to remove dusts from the heat collecting medium entering the heat collecting medium dust remover; and a heat collecting medium circulating device which is disposed downstream of the heat collecting medium dust remover in the flow direction of the heat collecting medium, which is in communication with the heat collecting medium dust remover through a pipe, and which is configured to convey the heat collecting medium from the heat collecting medium dust remover into the heat collecting medium storage device.

In accordance with a further aspect of the present disclosure, there is provided a solar power generation system including: the above solar heat collecting system.

In accordance with embodiments of the present disclosure, the solar power generation system further includes: a condensing system configured to condense sunlight to the solar heat collecting system; and a power generation system which is configured such that a heat is transferred by the solar heat collecting system into the power generation system to generate a power.

DETAILED DESCRIPTION

Figure 1:
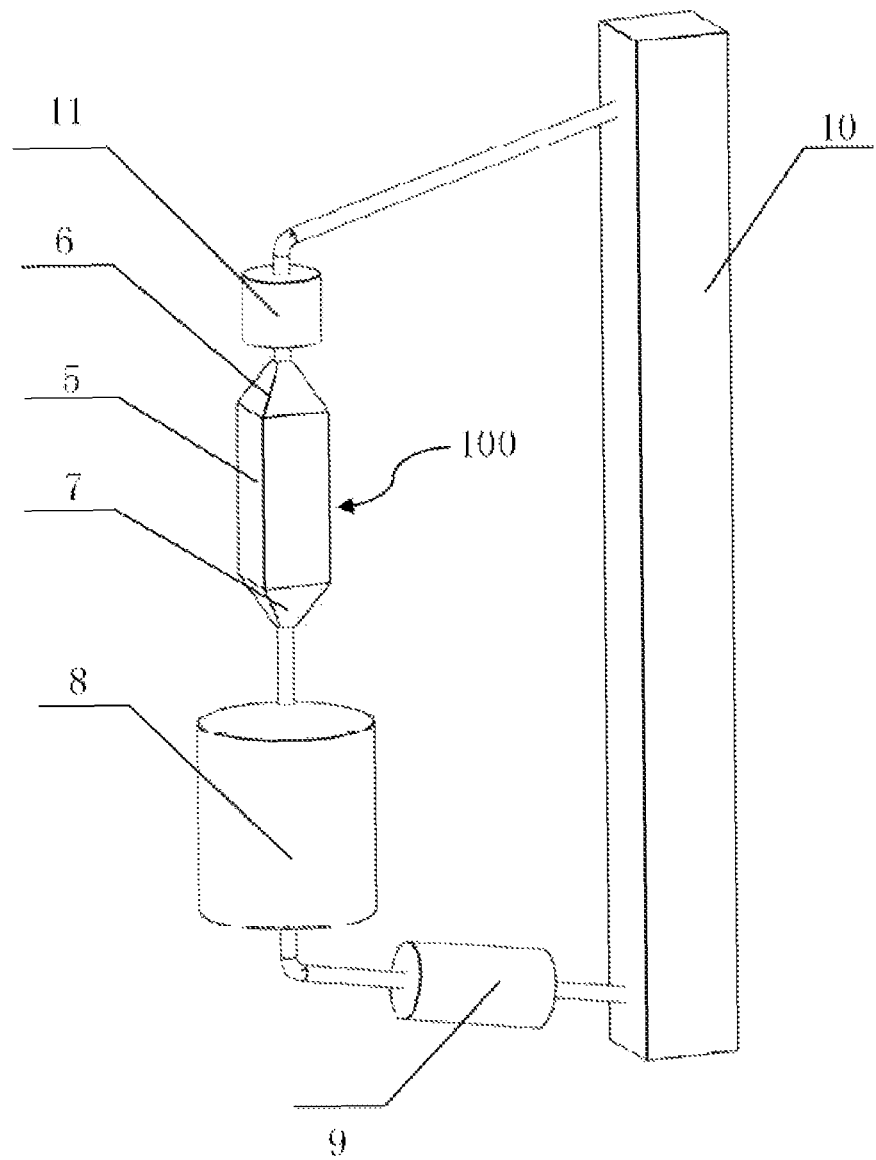
FIG. 1 is a schematic diagram of a solar heat collecting system including a solar heat absorber, according to an embodiment of the present disclosure.

Embodiments of the present disclosure will be now described in detail with reference to the accompanying drawings in which the same reference numerals correspond to the same elements. However, there are many different implementations of the present disclosure. The present disclosure should not be construed as being limited to the described embodiments, but the embodiments of the present disclosure are merely provided such that the present disclosure is comprehensive and complete and the concept of the present disclosure is fully conveyed to those skilled in the art.

As shown in FIG. 1, a solar heat collecting system and a solar heat absorber according to an embodiment of the present disclosure are shown. The solar heat absorber is denoted by a reference numeral 100.

According to embodiments of the present disclosure, there is provided a solar heat absorber. The solar heat absorber includes: an inlet 6 through which a heat collecting medium enters the solar heat absorber 100; a passage member 5 configured to be fluidly connected with the inlet 6 such that the heat collecting medium enters the passage member 5 through the inlet 6; and a collection member 7 configured to be fluidly connected with the passage member 5 such that the heat collecting medium enters the collection member 7 through the passage member 5. In embodiments of the present disclosure, the passage member 5 may be placed obliquely or vertically.

According to embodiments of the present disclosure, the heat collecting medium is a flow of ceramic particles. In other words, in the heat absorber, the ceramic particles are in a flow state, i.e. the flow of the ceramic particles. According to embodiments of the present disclosure, the flow of the ceramic particles is configured to have a flow speed of 0.1-2 m/s.

According to embodiments of the present disclosure, the ceramic particles have a packing factor of 0.5-0.7. The packing factor as used herein means a ratio of a total volume of all the particles to a total volume of a space occupied by all the particles.

Figure 7:
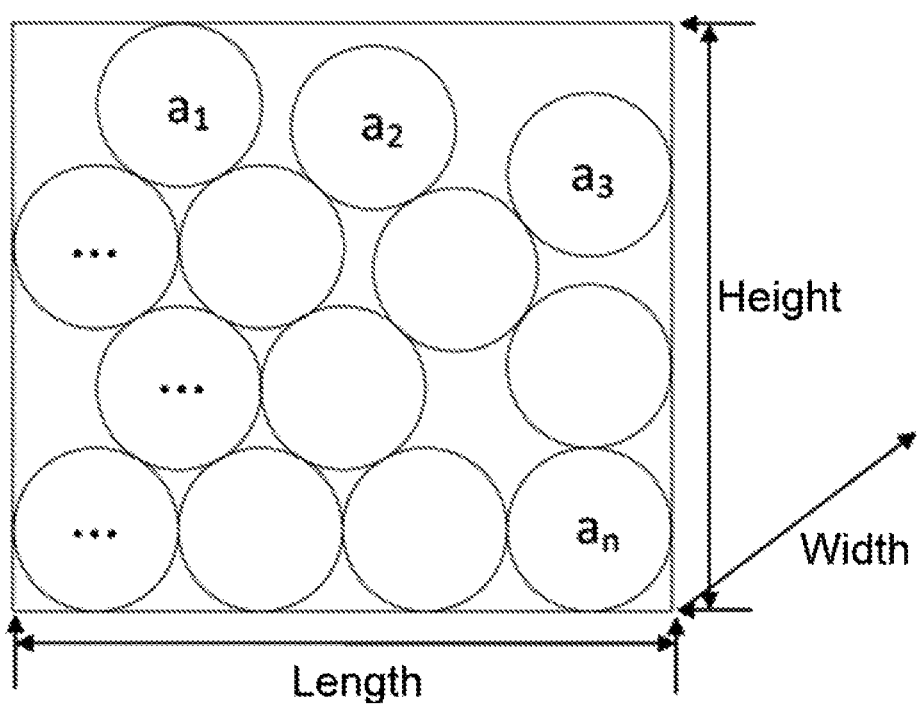
FIG. 7 is a schematic diagram showing a relation between ceramic particles and a space occupied by the ceramic particles, according to an embodiment of the present disclosure.

Particularly, the packing factor as used herein characterizes a concentration of the ceramic particles. As shown in FIG. 7, a relation between the ceramic particles and the space occupied by the ceramic particles is shown. As shown in FIG. 7, the ceramic particles are shown. These ceramic particles are randomly packed with gaps among them. Assuming volumes of the particles are indicated by a1, a2, . . . , an, respectively, and a space occupied by these ceramic particles has a length, a width and a height as shown in FIG. 7, the packing factor is a ratio of a sum (a1+a2+a3+ . . . +an) of the volumes of all the particles to a total volume (length*width*height) occupied by these packed particles. On the other hand, a flow speed and a packing condition and thus a value of the packing factor vary depending upon a position due to a randomness of the flow of the ceramic particles as the heat collecting medium in the heat absorber or the heat collecting system.

Particularly, it is pointed out by the inventors that FIG. 7 only schematically illustrates a method of calculating the packing factor and the space occupied by the ceramic particles as a cube. In actual applications, the space occupied by the ceramic particles may have any other shape such as a cylindrical shape, a conical shape or any other irregular shape. In this case, the packing factor is calculated by the ratio of the total volume of all the particles to the total volume of the space occupied by all the particles. In other words, the packing factor is a ratio of the sum (a1+a2+a3+ . . . +an) of the volumes of all the particles to the total volume of the space (a space having any shape) occupied by these packed particles.

According to embodiments of the present disclosure, each of the ceramic particles has a diameter of 0.1 mm-6 mm.

According to embodiments of the present disclosure, a material of the ceramic particles is selected from one of a carbide ceramic, a nitride ceramic or an oxide ceramic, or a mixture thereof.

Specifically, the heat collecting medium in the heat absorber 100 is a flow of ceramic particles. In embodiments of the present disclosure, the ceramic particle may have a spherical shape or a quasi-spherical shape, and is capable of flowing in the heat absorber 100. The flow of the ceramic particles enters the passage member 5 of the heat absorber 100 through the inlet 6 of the heat absorber 100.

In embodiments of the present disclosure, the flow of the ceramic particles is used as the heat collecting medium, and the packing factor of the ceramic particles is in the range of 0.5-0.7, and preferably is about 0.57. Multi-hole passage units or chutes, which are capable of being joined and which are made of heat absorbing materials/heat conducting materials having different transparencies, serve as a passage in which the heat collecting medium flows. The ceramic particles as the heat collecting medium (a heat transferring medium) may be made of a high-temperature resistant material, such as a carbide ceramic, a nitride ceramic or an oxide ceramic, for example, zirconia, alumina, zirconium nitride, silicon carbide, and the like, and a high-temperature resistant material composed of a mixture thereof, which can ensure that the heat absorber operates at a temperature in the range of 300-1200° C. and even above 1200°. A material such as a carbide can absorb/conduct a solar energy to the utmost extent due to its great thermal conductivity and radiation absorptivity. The diameter of the particle is in the range of 0.1-6 mm, and preferably is about 1 mm.

In addition, a transparent or translucent/opaque material may be selected as the material of the passage unit. A high-temperature resistant material having a low thermal conductivity and a high transmittance, for example a high-temperature resistant material such as a carbide ceramic, a nitride ceramic or an oxide ceramic, and a mixture thereof, or a material such as quartz may be selected as the transparent material. The opaque material may be a high-temperature resistant material having a high radiation absorptivity and a high thermal conductivity, for example a high-temperature resistant material of which a heat absorptivity is optimized, such as a carbide ceramic, a nitride ceramic or an oxide ceramic, and the like.

Particularly, the above materials are not intended to limit the present disclosure, and those skilled in the art may also adopt other suitable materials according to the teaching of the above technical solutions.

Figure 2:
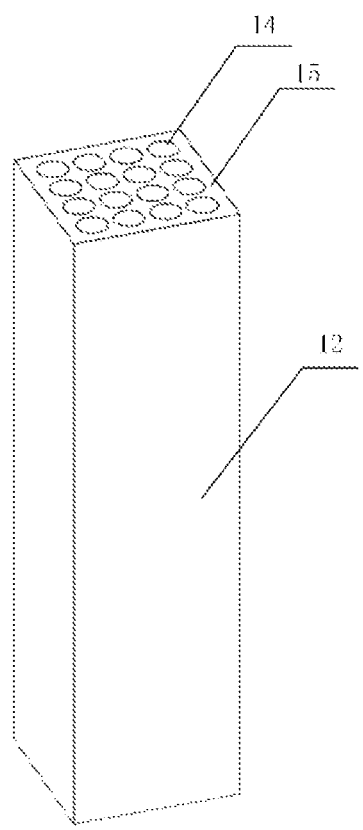
FIG. 2 is a schematic diagram showing a structure of passage units of the solar heat absorber according to an embodiment of the present disclosure.
Figure 3:
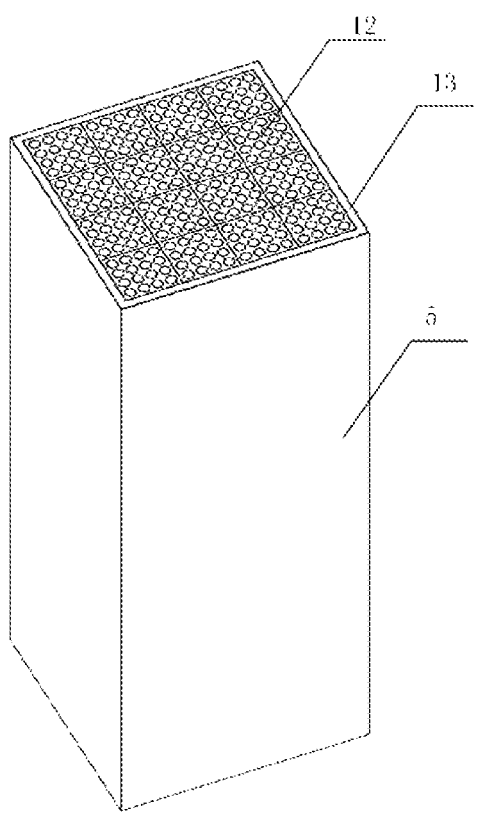
FIG. 3 is a schematic diagram showing a structure of a passage member of the solar heat absorber according to an embodiment of the present disclosure.

According to embodiments of the present disclosure, as shown in FIGS. 2 and 3, the passage member 5 includes: a plurality of passage units 12, each including: a hole 14 in which the heat collecting medium flows; and a base body 15 surrounding the hole; and an outer layer portion 13 fixing the passage units 12 to be integrated. The passage member having a different shape may be formed by joining the plurality of passage units by fixing them through the outer layer portion 13 according to requirements.

Figure 4:
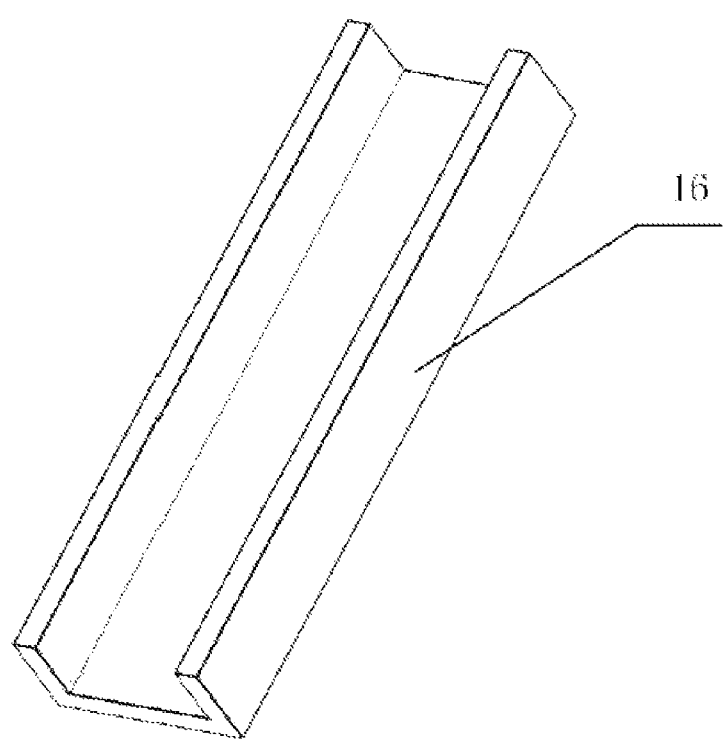
FIG. 4 is a schematic diagram showing a partial structure of the passage units of the solar heat absorber according to an embodiment of the present disclosure.

According to embodiments of the present disclosure, the passage unit 12 has a shape of a prism or a chute 16. As shown in FIG. 4, an example in which the passage unit 12 of the present disclosure is the chute is shown. The heat collecting medium enters the passage unit in the form of the chute from an upper end of the passage unit, and flows into the collection member 7 from a lower end of the passage unit under the action of gravity after being heated by sunlight 4 (radiation energy flow). In addition, if a prismatic structure is selected for the passage member 5, the passage member having a lattice structure or a honeycomb structure in a cross direction may be formed by joining, and a length of the passage member in a longitudinal direction may be adjusted according to requirements. The heat collecting medium is driven by gravity to flow through the holes of the passage units 12 and to be conveyed into the collection member 7 after absorbing heat.

A density and a size of the holes 14 of the passage unit 12 may be set according to requirements. Particularly, the above structure of the passage member is only an example, and does not constitute a limitation on the prevent disclosure, and those skilled in the art may also adopt passage members in other forms.

Further, the passage unit may be filled with a gas which may be air, or carbon dioxide, helium, nitrogen, oxygen or the like for increasing a heat exchange efficiency. A gas pressure in the passage may be in the range of 0.1-10 atmospheres, and preferably about 1 atmosphere.

According to embodiments of the present disclosure, as shown in FIG. 1, the collection member 7 has a funnel shape to control a flow rate and a flow speed of the heat collecting medium.

In embodiments of the present disclosure, the outer layer portion 13 fixes the passage units 12. Each of the base body 15 of the passage unit and the outer layer portion 13 may be a transparent material or an opaque material. In embodiments of the present disclosure, if a transparent material is selected for the base body 15, a transparent material is also selected for the outer layer portion 13. If an opaque material is selected for the base body 15, the outer layer portion 13 may be a transparent or opaque material. When each of the base body and the outer layer portion is a transparent material, the transparent material will transmit the sunlight 4 (radiation energy flow). When each of the base body and the outer layer portion is an opaque material, the sunlight 4 (radiation energy flow) will be absorbed by the opaque material and will be transferred to the heat collecting medium in the hole 14. If the outer layer portion 13 is a transparent material, a gap may be reserved between the passage units 12 and the outer cladding 13 and is evacuated to maintain internal heat. If the outer layer portion 13 is an opaque material, the outer layer portion and the base body may be in close contact with each other to facilitate a heat transfer.

In accordance with another aspect of the present disclosure, there is provided a solar heat collecting system including the above solar heat absorber.

According to embodiments of the present disclosure, as shown in FIG. 1, the solar heat collecting system further includes: a heat collecting medium storage device 11 which is disposed upstream of the solar heat absorber 100 in a flow direction of the heat collecting medium, and which is in communication with the solar heat absorber 100 through a pipe such that the heat collecting medium flows from the heat collecting medium storage device 11 into the solar heat absorber 100; a heat exchanger 8 which is disposed downstream of the solar heat absorber 100 in the flow direction of the heat collecting medium, which is in communication with the solar heat absorber 100 through a pipe, and which is configured to transfer a heat absorbed by the heat collecting medium from the heat collecting medium; a heat collecting medium dust remover 9 which is disposed downstream of the heat exchanger 8 in the flow direction of the heat collecting medium, which is in communication with the heat exchanger 8 through a pipe, and which is configured to remove dusts from the heat collecting medium entering the heat collecting medium dust remover; and a heat collecting medium circulating device 10 which is disposed downstream of the heat collecting medium dust remover 9 in the flow direction of the heat collecting medium, which is in communication with the heat collecting medium dust remover 9 through a pipe, and which is configured to convey the heat collecting medium from the heat collecting medium dust remover 9 into the heat collecting medium storage device 11.

Figure 6:
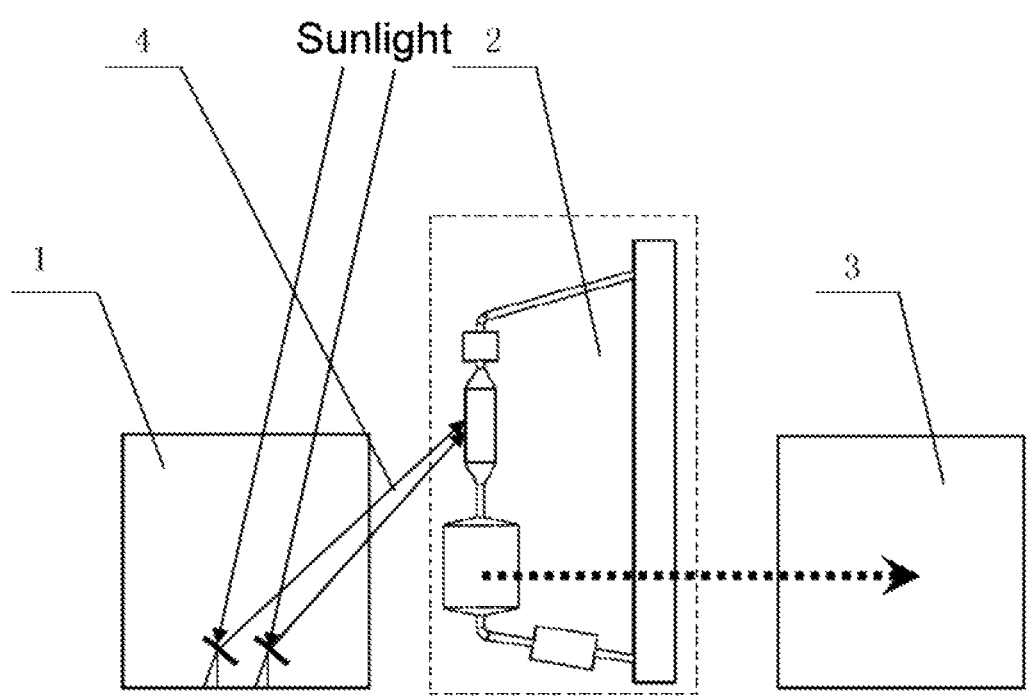
FIG. 6 is a schematic diagram showing a structure of a solar power generation system according to an embodiment of the present disclosure.

As shown in FIGS. 1 and 6, the flow of the ceramic particles obtaining the heat flows out of the collection member 7 and then enters the heat exchanger 8 through a conveying pipe. In the heat exchanger 8, the heat absorbed by the heat collecting medium may be transferred from the heat collecting medium to generate a power in a power generation system 3. The heat collecting medium is processed by the heat collecting medium dust remover 9 after the heat exchange, and then enters the heat collecting medium circulating device 10. The heat collecting medium is conveyed by the heat collecting medium circulating device 10 to the heat collecting medium storage device 11 located upstream of the heat absorber 100. After that, the heat collecting medium returns to the inlet 6 of the heat absorber through a pipe again for a next heat absorbing process. The solar heat collecting system circularly operates in this way.

An operational process of the solar heat collecting system of the present disclosure is described in brief as below.

As shown in FIGS. 1 and 6, a radiation energy flow collected by a condensing device is projected onto the heat absorber 100, and is absorbed by a flow of dense ceramic particles. The flow of the dense ceramic particles in the heat absorber is driven by gravity to flow downwards through the hole of the passage at a vertical angle or an oblique angle. The dense ceramic particles can pass through the passage at a controllable flow speed due to an angle of inclination of the passage or a size of an opening of a funnel, thereby ensuring that heat can be sufficiently absorbed by/transferred to the heat collecting medium. A multihole structure of the passage member and a smaller size of the ceramic particles are favorable to a higher efficiency heat transfer. The ceramic particles absorbing the heat flow through the hole into a collection device connected to a bottom of the passage, and then enter the heat exchanger located downstream, so that the heat is transferred from the ceramic particles to generate a power. After an end of the heat exchange, the heat collecting medium enters the heat collecting medium dust remover located downstream, to screen the heat collecting medium and remove dusts from the heat collecting medium. After that, the heat collecting medium is conveyed by the heat collecting medium circulating device to the storage device located upstream of the heat absorber, and enters the heat collecting system again. The heat collecting medium dust remover may also be used as the heat collecting medium storage device.

The solar heat absorber and the solar heat collecting system according to the present disclosure have a simplified structure, achieve a high efficiency absorption of the radiation energy flow under different conditions to the utmost extent, and remarkably increase the heat collecting efficiency. In addition, since there is no inserted member, problems of fatigue and wear of the inserted member are avoided. A flow state and a flow speed of the ceramic particles may be controlled by an angle of inclination of the passage member and a size of an outlet of the collecting device, while a block of the device is avoided.

In accordance with a further aspect of the present disclosure, there is provided a solar power generation system including: the above solar heat collecting system.

According to embodiments of the present disclosure, as shown in FIG. 6, the solar power generation system further includes: a condensing system 1 configured to condense sunlight 4 to the solar heat collecting system 2; and a power generation system 3 which is configured such that a heat is transferred by the solar heat collecting system 2 into the power generation system 3 to generate a power.

Figure 5:
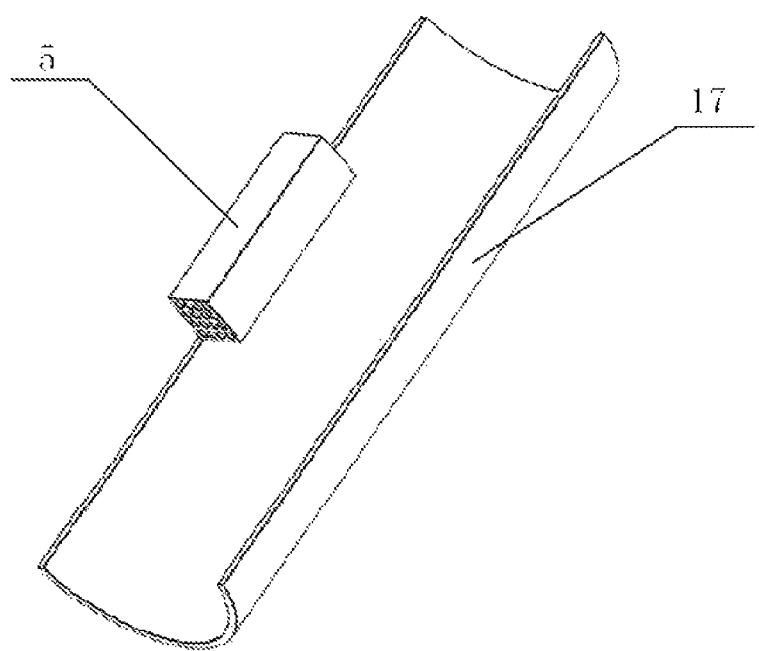
FIG. 5 is a schematic diagram showing a structure of the passage member of the solar heat absorber used in cooperation with a condenser, according to an embodiment of the present disclosure.

In embodiments of the present disclosure, the condensing system 1 may be composed of an array of mirrors, and a tower, dish or groove condenser may be selected according to requirements. As shown in FIG. 5, the groove condenser 17 is shown. Of course, the setting of the above condensing system is only an example, and is not intended to limit the prevent disclosure, and those skilled in the art may also adopt condensing systems in other forms.

Further, as a working medium in the power generation system, vapor, such as water vapor, supercritical water, ultra-supercritical water, supercritical carbon dioxide, or the like may be used.

In the present disclosure, the ceramic particles are used as the heat collecting medium, and the heat absorber having a simplified structure is provided. The improvements increase a heat collecting efficiency and a heat exchange efficiency. Further, both a power generation efficiency and an operational stability of the power generation system including the above heat absorber are remarkably improved.

While the embodiments of the present disclosure have been shown and described, it would be appreciated by those skilled in the art that changes may be made therein without departing from the principles and spirit of the present disclosure, and the changes will fall within the scope of the present disclosure which is defined in the appended claims and their equivalents.

What is claimed is:

1. A solar heat absorber comprising:
an inlet through which a heat collecting medium enters the solar heat absorber;
a passage member configured to be fluidly connected with the inlet such that the heat collecting medium enters the passage member through the inlet; and
a collection member configured to be fluidly connected with the passage member such that the heat collecting medium enters the collection member through the passage member,
wherein the heat collecting medium is a flow of ceramic particles,
wherein a material of the ceramic particles is selected from one of a carbide ceramic, a nitride ceramic or an oxide ceramic, or a mixture thereof,
wherein the heat absorber operates at a temperature above 1200° C.,
wherein the passage member comprises a plurality of passage units, each comprising: a hole in which the heat collecting medium flows; and a base body surrounding the hole; and an outer layer portion fixing the passage units to be integrated,
wherein in response to the base body of the passage member being a transparent material, the outer layer portion is also a transparent material, in response to the base body of the passage member being an opaque material, the outer layer portion is a transparent material or an opaque material, and
wherein in response to the outer layer portion being a transparent material, a gap is reserved between the passage units and the outer layer portion; and in response to the outer layer potion being an opaque material, the outer layer portion and the base body are in close contact with each other.

2. The solar heat absorber of claim 1, wherein the ceramic particles have a packing factor of 0.5-0.7.

3. The solar heat absorber of claim 1, wherein each of the ceramic particles has a diameter of 0.1 mm-6 mm.

4. The solar heat absorber of claim 1, wherein the flow of the ceramic particles is configured to have a flow speed of 0.1-2 m/s.

5. The solar heat absorber of claim 1, wherein each of the plurality of passage units has a shape of a prism or a chute.

6. The solar heat absorber of claim 1, wherein the collection member has a funnel shape.

7. A solar heat collecting system comprising:
the solar heat absorber of claim 1.

8. The solar heat collecting system of claim 7, further comprising:
a heat collecting medium storage device which is disposed upstream of the solar heat absorber in a flow direction of the heat collecting medium, and which is in communication with the solar heat absorber through a pipe such that the heat collecting medium flows from the heat collecting medium storage device into the solar heat absorber; and
a heat exchanger which is disposed downstream of the solar heat absorber in the flow direction of the heat collecting medium, which is in communication with the solar heat absorber through a pipe, and which is configured to transfer a heat absorbed by the heat collecting medium from the heat collecting medium.

9. A solar power generation system comprising:
the solar heat collecting system of claim 7.

* * * * *